(12) United States Patent
Van Stralen et al.

(10) Patent No.: US 8,662,011 B2
(45) Date of Patent: Mar. 4, 2014

(54) APPARATUS FOR CARRYING OUT PLASMA CHEMICAL VAPOUR DEPOSITION AND METHOD OF MANUFACTURING AN OPTICAL PREFORM

(75) Inventors: Mattheus Jacobus Nicolaas Van Stralen, Tilburg (NL); Igor Milicevic, Helmond (NL); Johannes Antoon Hartsuiker, Eindhoven (NL)

(73) Assignee: Draka Comteq B.V. (NL)

( * ) Notice: Subject to any disclaimer, the term of this patent is extended or adjusted under 35 U.S.C. 154(b) by 1113 days.

(21) Appl. No.: 12/113,512

(22) Filed: May 1, 2008

(65) Prior Publication Data

US 2008/0274300 A1    Nov. 6, 2008

(30) Foreign Application Priority Data

May 1, 2007   (NL) ..................................... 1033783

(51) Int. Cl.
  *C23C 16/00*  (2006.01)
  *C23F 1/00*  (2006.01)
  *H01L 21/306*  (2006.01)

(52) U.S. Cl.
  USPC ....... 118/723 MW; 118/723 ME; 118/723 R; 156/345.41

(58) Field of Classification Search
  USPC ....... 118/723 MW, 723 ME, 723 MR, 723 R; 427/230, 231; 65/391, 436; 156/345.41
  See application file for complete search history.

(56) References Cited

U.S. PATENT DOCUMENTS

| | | | |
|---|---|---|---|
| RE30,635 E * | 6/1981 | Kuppers et al. | 427/573 |
| 4,292,063 A * | 9/1981 | Abe | 65/417 |
| 4,714,589 A * | 12/1987 | Auwerda et al. | 427/573 |
| 4,844,007 A | 7/1989 | Eikelboom | |
| 4,877,938 A | 10/1989 | Rau et al. | |
| 5,310,426 A * | 5/1994 | Mori | 118/723 AN |
| 5,698,036 A * | 12/1997 | Ishii et al. | 118/723 MW |
| 5,895,548 A * | 4/1999 | Ettinger et al. | 156/345.36 |
| 5,902,404 A * | 5/1999 | Fong et al. | 118/723 ME |
| 6,138,478 A * | 10/2000 | Neuberger et al. | 65/391 |
| 6,260,510 B1 | 7/2001 | Breuls et al. | |
| 2005/0257891 A1* | 11/2005 | Goto et al. | 156/345.41 |
| 2007/0003197 A1 | 1/2007 | Matthijsse et al. | |

FOREIGN PATENT DOCUMENTS

EP        0554845 A1   2/1993
WO    WO 03/086998 A1 * 10/2003  ............ C03B 37/018

* cited by examiner

*Primary Examiner* — Rakesh Dhingra
(74) *Attorney, Agent, or Firm* — Shumaker, Loop & Kendrick, LLP

(57) ABSTRACT

The present invention relates to an apparatus for carrying out plasma chemical vapor deposition, by which one or more layers of doped or undoped silica are deposited onto the interior of an elongated hollow glass substrate tube. The present invention further relates to a method of manufacturing an optical preform by means of plasma chemical vapor deposition, wherein doped or undoped glass-forming gases are passed through the interior of an elongated glass substrate tube while conditions for depositing glass layers are created in the interior of the substrate tube.

10 Claims, 2 Drawing Sheets

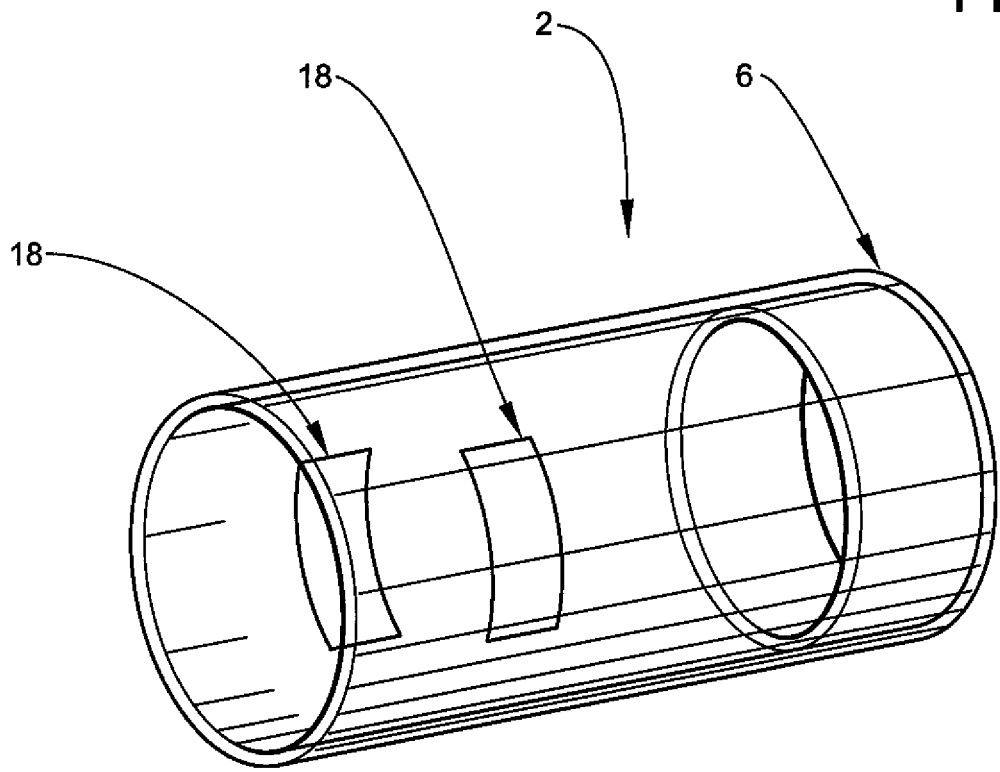

APPARATUS FOR CARRYING OUT PLASMA CHEMICAL VAPOUR DEPOSITION AND METHOD OF MANUFACTURING AN OPTICAL PREFORM

TECHNICAL FIELD AND BACKGROUND OF THE INVENTION

1. Field of the Invention

The present invention relates generally to an apparatus for carrying out plasma chemical vapour deposition by which one or more layers of doped or undoped silica are deposited onto the interior of an elongated hollow glass substrate tube, and more specifically, to an apparatus comprising a resonator having a resonant cavity formed essentially cylindrically symmetrically around a cylindrical axis, along which axis the substrate tube is positioned, wherein said resonant cavity is substantially annular in shape with a cylindrical inner wall and a cylindrical outer wall, and wherein said cylindrical inner wall comprises a slit that extends along at least part of a circle around the cylindrical axis into which resonant cavity a microwaveguide extends so that microwaves can exit to the cavity enclosed by the cylindrical inner wall via the aforesaid slit. The resonator surrounds at least part of the substrate tube and can be moved back and forth along the longitudinal axis of the substrate tube. The present invention further relates to a method of manufacturing an optical preform by means of plasma chemical vapour deposition, wherein doped or undoped glass-forming gases are passed through the interior of an elongated glass substrate tube under conditions such that deposition of glass layers takes place.

2. Technical Background

U.S. Pat. No. 4,877,938 relates to a method of manufacturing a preform in which a graphite tube is secured to metal parts of a furnace for absorbing microwave energy leaking from the resonant cavity.

U.S. Pat. No. 4,844,007 relates to a device for providing glass layers on the inside of a substrate tube, wherein the inside of a resonator is provided with a heat-insulating and/or heat reflecting material layer so as to thus effect a more uniform heat distribution along the length of the substrate tube.

US 2007/0 003 197 in the name of the present applicant relates to a method and device for manufacturing optical preforms, in which a protective tube envelopes a substrate tube along substantially the entire length thereof so as to create plasma conditions in the annular space formed between the substrate tube and the protective tube for the purpose of collapsing the substrate tube into a solid rod.

EP 0 554 845 relates to a method and apparatus for outside glass deposition of solid preforms, wherein a protective tube is provided along the entire length of the solid preform, and a furnace surrounds the assembly of protective tube and solid preform, in which furnace a resonator is movable along part of the length of the protective tube.

An apparatus for manufacturing optical fibres is known from U.S. Pat. No. 6,260,510 in the name of the present applicant, which apparatus may be used within that context for manufacturing a preform rod, for example, from which an optical fibre can be drawn. According to a known method of manufacturing such a preform, a straight vitreous substrate tube (comprised of quartz, for example) is deposited with layers of doped silica (for example germanium-doped silica) on the cylindrical interior surface thereof. The term "silica" as used herein is to be regarded to be any substance in the form of $SiO_x$, stoichometric or non-stoichometric, whether or not crystalline or amorphous. This can be achieved by positioning the substrate tube along the cylindrical axis of the resonant cavity and flushing the interior of the tube with a gaseous mixture comprising $O_2$, $SiSl_4$ and $GeCl_2$ (for example).

A localised plasma is concurrently generated within the cavity, causing the reaction of Si, O and Ge so as to effect direct deposition of thus for example Ge-doped $SiO_x$ on the interior surface of the substrate tube. Since such deposition only occurs in and in the vicinity of the localised plasma, the resonant cavity (and thus the plasma) must be swept along the cylindrical axis of the tube in order to uniformly deposit the interior surface of the hollow substrate tube along the entire length thereof. When coating is complete, the substrate tube is thermally collapsed into a solid rod having a Ge-doped silica core portion and a surrounding undoped silica cladding portion. If an extremity of the solid rod is heated so that it becomes molten, a thin glass fibre can be drawn from the solid rod, which glass fibre is usually provided with one or more coatings and can subsequently be wound on a reel; the fibre then has a core and a cladding portion corresponding to those of the solid rod.

Since the Ge-doped core has a higher refractive index than the undoped cladding, the fibre can function as a waveguide, for example for use in propagating optical telecommunication signals. It should be noted that the gaseous mixture flushed through the substrate tube may also contain other components; the addition of $C_2F_6$, for example, leads to a reduction in the refractive index of the doped silica. It should also be noted that the preform rod may be externally coated with an additional glass layer, for example silica by means of a deposition process, or by placing the preform rod in a jacket tube (comprised of undoped silica) prior to the drawing procedure, so as to thus increase the amount of undoped silica relative to the amount of doped silica in the final fibre.

The use of such an optical fibre for telecommunication purposes requires that the optical fibre be substantially free from defects (for example discrepancies in the percentage of dopants, undesirable cross-sectional ellipticity and the like), because, when considered over a large length of the optical fibre, such defects may cause a significant attenuation of the signal being transported. It is important, therefore, to realize a very uniform and reproducible PCVD process, because the quality of the deposited PCVD layers will eventually determine the quality of the fibres; thus it is desirable that the plasma generated in the resonant cavity be uniform (around the cylindrical axis of the cavity). On the other hand, the costs of the production process of an optical fibre will be significantly reduced if the preform rod can be given a larger diameter, because larger fibre lengths can then be obtained from a single rod. These two objects are difficult to reconcile, however, because an increased diameter of the substrate tube will generally lead to a plasma having a deteriorated rotational symmetry; moreover, such a plasma can only be generated by using a much higher microwave power.

The present inventors have found that particles may enter the resonator, for example small quartz particles that come off the substrate tube when the substrate tube is positioned in the apparatus for carrying out plasma chemical vapour deposition. In addition to that, particles from the insulating material of the furnace, in which furnace the resonator is disposed, may enter the resonator via the two ends thereof. When the aforesaid particles are present inside the resonator, this may lead to a short-circuit, viz. an undesirable discharge, during the creation of plasma conditions, which causes damage to the resonator. In addition, the deposition process must be stopped, which is undesirable.

The present inventors have furthermore found that metallic particles may come off the resonator during the plasma chemical deposition process and subsequently find their way onto the exterior surface of the substrate tube. Such metallic particles are not only harmful to the substrate tube, but also have an adverse effect on the operation of the resonator, as a result of which the plasma chemical vapour deposition process may become unstable. In addition, the presence of small metallic particles in an optical fibre leads to high fibre attenuations at certain wavelengths, which is undesirable.

BRIEF SUMMARY OF THE INVENTION

Therefore, is an object of the present invention to provide an apparatus for carrying out plasma chemical vapour deposition that minimizes the above-described problems.

It is another object of the present invention to provide an apparatus for carrying out plasma chemical vapour deposition in which the substrate tube can be accurately and reproducibly positioned in the space enclosed by the resonator.

It is a further object of the present invention to provide an apparatus for carrying out plasma chemical vapour deposition that enables precise control of the temperature of the substrate tube during the deposition process.

It is a further object of the present invention to provide apparatus in which a hollow inner tube is positioned against the cylindrical inner wall of the resonant cavity with a close fit, wherein inner tube extends along the cylindrical axis along at least part of the length of the resonant cavity and which is transparent to microwaves, and wherein the inner tube has a diameter such that the substrate tube can be positioned inside the inner tube.

To achieve the foregoing and other objects and advantages, and in accordance with the purposes of the invention as embodied and broadly described herein, the present invention provides apparatus for carrying out plasma chemical vapour deposition and methods of manufacturing an optical fiber perform.

In one embodiment, the present invention provides an apparatus for plasma chemical vapour deposition. The apparatus includes a resonator having a resonant cavity formed essentially cylindrically symmetrically around a cylindrical axis along which a substrate tube is positioned, wherein the resonant cavity is substantially annular in shape with a cylindrical inner wall and a cylindrical outer wall, and wherein the cylindrical inner wall comprises a slit that extends along at least part of a circle around the cylindrical axis, into which resonant cavity a microwaveguide extends so that microwaves can exit to the cavity enclosed by the cylindrical inner wall via the slit, and wherein the resonator surrounds at least part of the substrate tube and may be moved back and forth along the longitudinal axis of the substrate tube. The apparatus further includes a hollow inner tube positioned against the cylindrical inner wall of the resonant cavity, wherein the inner tube extends along the cylindrical axis along at least part of the length of the resonant cavity and is transparent to microwaves, and wherein the inner tube has a diameter such that the substrate tube may be positioned inside the inner tube.

Further, the inner tube extends along the cylindrical axis to outside the resonator, the inner tube is connected to the resonator and is moved synchronously with the resonator along the longitudinal axis of the substrate tube, and the length of the inner tube is less than the length of the substrate tube and no more than twice the length of the resonator. The inner tube may include an inner ring at least one of its ends. A difference between the external diameter of the substrate tube and the internal diameter of the inner ring is no more than about 3 mm. The inner tube further includes at least one opening extending along part of a circle around the wall of the inner tube and the opening is positioned proximate the slit in the cylindrical inner wall of the resonant cavity.

Further, the microwaveguide includes a means for supplying a gas to the space enclosed by the cylindrical inner wall of the resonant cavity and the inner tube. The slit in the cylindrical wall of the resonant cavity extends in a full circle around the cylindrical axis, and wherein part of the circle is interrupted, using a screening element. The inner tube may be made from any suitable material including, but not limited to, quartz glass having a melting point higher than 1000° C. Still further, the internal diameter of the inner tube may vary along the length thereof.

In another embodiment, the present invention provides a method of manufacturing an optical perform comprising: providing a substrate tube; providing a resonator having a resonant cavity formed cylindrically symmetrically around a cylindrical axis along which the substrate tube is positioned, wherein the resonant cavity is substantially annular in shape with a cylindrical inner wall and a cylindrical outer wall, and wherein the cylindrical inner wall comprises a slit that extends along at least part of a circle around the cylindrical axis, into which resonant cavity a microwaveguide extends so that microwaves can exit to the cavity enclosed by the cylindrical inner wall via the slit, and wherein the resonator surrounds at least part of the substrate tube and may be moved back and forth along the longitudinal axis of the substrate tube; providing a hollow inner tube positioned against the cylindrical inner wall of the resonant cavity, wherein the inner tube extends along the cylindrical axis along at least part of the length of the resonant cavity and is transparent to microwaves, and wherein the inner tube has a diameter such that the substrate tube may be positioned inside the inner tube; and, passing doped or undoped glass-forming gasses through the interior of an elongated glass substrate tube while deposition conditions are created in the interior of the substrate tube for forming glass layers.

BRIEF DESCRIPTION OF THE FIGURES

The present invention will now be explained in more detail with reference to the accompanying figures in which:

FIG. 2 is a perspective view of an inner tube according to the present invention.

DETAILED DESCRIPTION OF THE INVENTION

Figure 1:
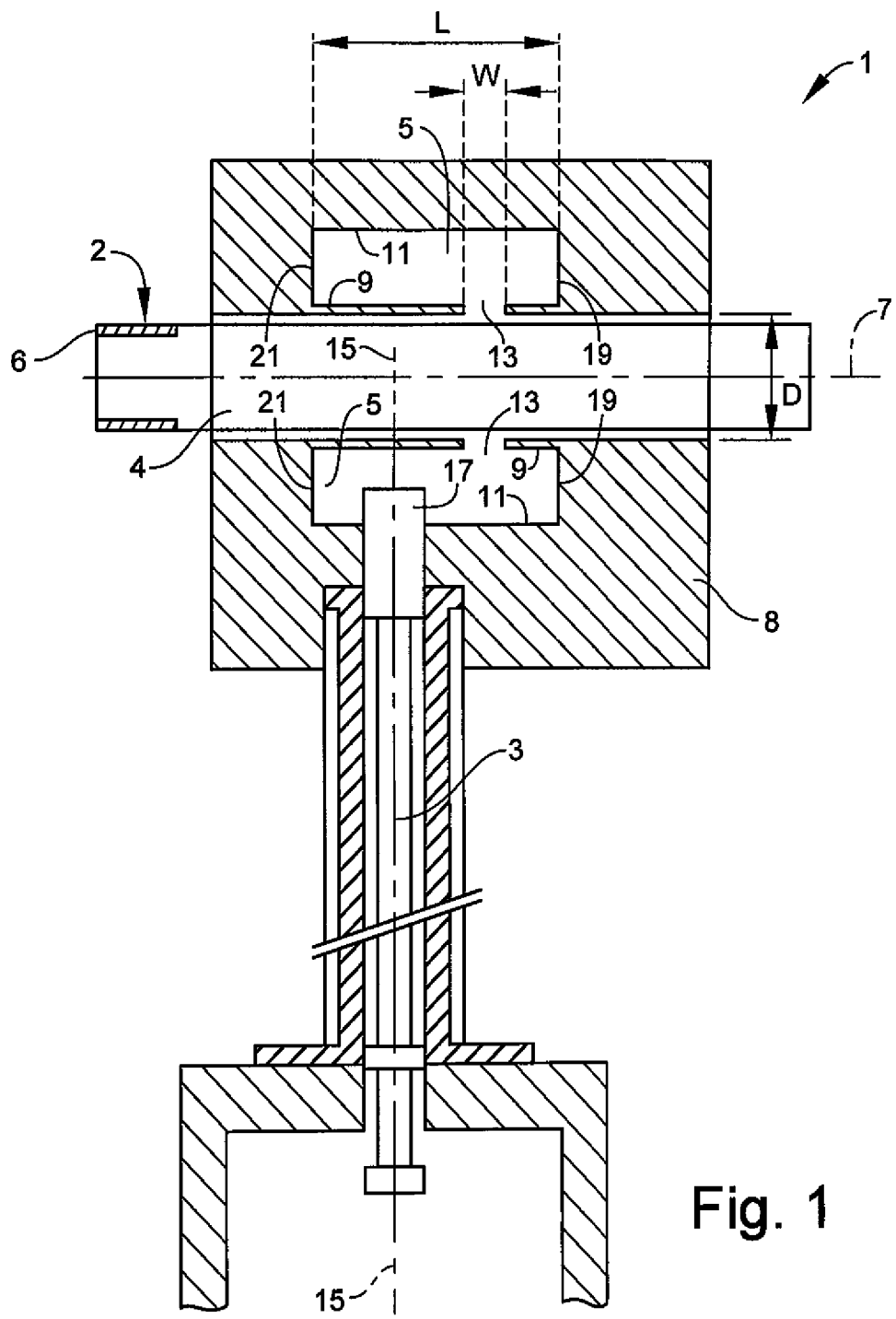
FIG. 1 is a cross-sectional view of a part of the PCVD apparatus according to the present invention.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring now to the Figures, FIG. 1 is a cross-sectional view of a part of the PCVD apparatus 1 according to the present invention. The apparatus 1 comprises an elongated microwaveguide 3, which is connected to a klystron (not shown) on a resonant cavity 5, which extends circularly symmetrically around a cylindrical axis 7. The resonant cavity 5 is moved back and forth along the cylindrical axis 7 during the deposition process, so that the plasma zone is continuously moved along the length of the substrate tube (not shown). The resonant cavity 5 is essentially annular in shape, with a cylindrical inner wall 9 and a cylindrical outer wall 11. The cylindrical inner wall 9 comprises a slit 13, which (in this embodiment) extends in a full circle around the cylindrical axis 7 (in a plane perpendicular to the plane of the figure). The microwaveguide 3 has a (central) longitudinal axis 15, which extends substantially perpendicularly to the cylindrical axis 7. The longitudinal axis 15 and the slit 13 are staggered relative to each other in such a manner that the axis 15 does not bisect the slit 13. The resonant cavity 5 is surrounded by a furnace (not shown), which is stationary, i.e., which is not movable along the cylindrical axis 7.

FIG. 1 schematically shows an inner tube 2, which inner tube 2 extends along the cylindrical axis 7 to outside the resonator 8. The inner tube 2 is positioned against the cylindrical inner wall 9 of the resonant cavity 5 with a close fit, and a substrate tube (not shown) can be positioned in the cylindrical space 4 enclosed by the cylindrical inner wall 9. To center the substrate tube in the interior of the inner tube 2, the inner tube 2 is provided with an inner ring 6 at one end, in which connection it can be noted that a similar inner ring 6 may also be provided at the other end of the inner tube 2. Such an inner ring 6 provides a reduction of the internal diameter of the inner tube 2 at the location of the inner ring 6, which inner ring 6 abuts against the interior wall of the inner tube 2. In a specific embodiment of the present invention it is also possible to provide the inner tube 2 with an inner ring 6 at a number of longitudinal positions thereof. Furthermore, it is possible to vary the internal diameter of the inner tube 2 along the length thereof.

The resonant cavity 5 has a length L parallel to the cylindrical axis 7, while W indicates the width of the slit 13 (measured in the same direction). As indicated here, the longitudinal axis 15 of the guide 3 is offset to one side, so that it does not bisect the resonant cavity 5, viz. the distance between the axis 15 and each end 19, 21 of the resonant cavity 5, measured in a direction parallel to the axis 7, is not L/2.

As indicated herein, the guide 3 is closed by a body 17 which is transparent to microwaves in the region where the guide 3 extends into the resonant cavity 5; the body 17 may take the shape of a TEFLON (poly tetra fluoro ethylene) "plug".

A cylindrical cavity 4 having a diameter D, which has an open end, is present within the inner wall 9 of the resonant cavity 5 and extends along the cylindrical axis 7. A substrate tube (not shown) may be positioned within, and be inserted along, said cavity 4.

Referring to FIG. 2, the inner tube 2 shown in FIG. 1 is shown in perspective view, in which the inner tube 2 is provided with an inner ring 6 at one end. Additionally, the inner tube 2 is provided with two openings 18, which extend along part of a circle around the wall of the inner tube 2. It is particularly desirable that in the position in which the inner tube 2 is inserted into the resonator 8, the openings 18 be located near the slit 13 in the cylindrical inner wall 9. The aforesaid openings 18 in particular function to control the temperature of the inner tube 2 during the PCVD process, in particular by supplying a gas, for which purpose compressed air may be used. The substrate tube may also be cooled during the deposition process, in which case the supply of cooling medium may take place via the microwaveguide 3.

The use of the inner tube 2 prevents unwanted particles from depositing on the exterior surface of the substrate tube. In addition, the use of the inner tube 2 prevents contact between the substrate tube and the resonator 8. Another additional advantage is the fact that the use of the present inner tube 2 makes it possible to keep the incorporation of chlorine in the glass layers realized by means of the deposition process sufficiently low, which is important in particular because the presence of chlorine during the subsequent collapsing process, in which the hollow substrate tube is formed into a solid preform, may lead to the formation of chlorine bubbles, which will have an adverse effect on the quality of the solid preform. In addition, the use of the present inner tube 2 has led to a more reproducible and stable temperature distribution in the substrate tube in comparison with an apparatus in which a substrate tube not provided with an inner tube. Temperature distribution has an advantageous effect on the deposition process that takes place in the interior of the hollow substrate tube. Additionally, the presence of one or two inner rings 6 has been found to have an advantageous effect on the centering of the substrate tube in the resonator 8, preventing undesirable deflection of the substrate tube at high temperatures. Moreover, a suitable selection of the composition of the inner tube 2 will prevent the inner tube 2 from melting at high plasma power levels and high deposition rates.

By preventing particles from depositing on the exterior surface of the elongated glass substrate tube, a possible short-circuit, also called discharge, between the substrate tube and the resonator 8 is prevented. Such particles are undesirable, because they influence the temperature of the substrate tube and, to a lesser extent, also the distribution of microwaves. Furthermore, the thermal contracting operation, by which the hollow substrate tube is formed into a solid rod, also referred to as the collapsing process, and the subsequent drawing operation in the drawing tower will be adversely affected, and a fibre comprising the aforesaid particles will exhibit a higher attenuation. Because of the special construction of the inner tube 2 and the resonator 8, the inner tube 2 moves with the resonator during the reciprocating movement of the resonator 8 over the substrate tube. The inner tube 2 can thus be regarded as being stationary relative to the resonator 8. This means that no particles can deposit on the exterior surface of the elongated glass substrate tube during the reciprocating movement of the resonator.

The inner tube 2 preferably extends along the cylindrical axis to outside the resonator 8. The inner tube 2 is preferably connected to the resonator in such a manner that the inner tube can be moved synchronously with the resonator 8 along the longitudinal axis of the substrate tube. In addition, the length of the inner tube 2 is preferably less than the length of the substrate tube, more particularly, the length of the inner tube 2 is no more than twice the length of the resonator 8. The inner tube 2 also extends over the slit 13 in the resonant cavity 5. Because of the transparency to microwaves of the inner tube 2, the microwaves can enter the interior of the resonant cavity 5. To achieve a good radial positioning of the substrate tube, the inner tube 2 is provided with the inner ring 6 at least one end thereof. The inner ring 6 is to be regarded as a tube portion placed in the interior of the inner tube 2, in particular at the end thereof, so that the internal diameter of the inner tube is reduced at the location of the aforesaid inner ring. In a specific embodiment, the inner tube 2 is provided with an inner ring 6 at both ends. The difference between the external diameter of the substrate tube and the internal diameter of the inner ring is preferably no more than 3 mm. To realize proper positioning and support of the substrate tube, the inner tube 2 includes the one or more openings extending along part of a circle around the wall of the inner tube. In a specific embodiment, the internal diameter of the inner tube varies along its length.

The presence of the inner ring 6 prevents the substrate tube from coming into contact with the cylindrical inner wall 9 of the resonant cavity 5 during rotation of the substrate tube.

Undesirable contact between the substrate tube and the resonant cavity 5 may lead to the exterior surface of the substrate tube being damaged, as a result of which quartz particles can come off, resulting in contamination also of the interior surface of the resonant cavity. Furthermore, metallic particles may deposit on the exterior of the substrate tube, resulting in a change in the temperature of the substrate tube.

In order to prevent the inner tube 2 from melting during the plasma chemical vapour deposition process, the inner tube 2 is provided with the one or more openings 18 that extend along part of a circle around the wall of the inner tube, in particular if the one or more openings are located near the slit 13 in the cylindrical inner wall of the resonant cavity 5. When such openings are used, it is possible to add a gas thereto, for example nitrogen or air, thereby cooling the inner tube and, in addition, preventing the inner tube from melting.

Suitable materials for the inner tube 2, which materials are preferably transparent to microwaves and resistant to high temperatures, include but are not limited to, quartz or a ceramic material, such as aluminium oxide or boron nitride. Specific examples of the present inner tube are defined below.

It should be noted that the term "microwaveguide" as used herein is meant to have a broad meaning and is to be interpreted to relate to all means for efficiently transferring microwave energy from a generating element (for example a klystron or a microwave oven) to the resonant cavity. More particularly, the term comprises specific means such as an antenna, a coaxial guide, a waveguide and the like.

In another embodiment, the present invention provides a method of manufacturing an optical fibre, wherein the method includes a PCVD process carried out in the apparatus 1 where the substrate tube is located along the cylindrical axis and within the interior wall of the resonant cavity 5, wherein the substrate tube and the cavity are essentially coaxial and wherein the resonant cavity is moved back and forth along (at least part of) the length of the substrate tube. The resonant cavity and part of the substrate tube are surrounded by a furnace. Such an application of the PCVD apparatus according to the present invention enables an efficient manufacture of the preform rod and results in a preform rod in which the dopants exhibit a high degree of rotational symmetry, seen in cross-sectional view, with the resulting optical fibre thus exhibiting a low degree of signal attenuation.

The preform rod may be placed in a silica jacket tube prior to the drawing of the optical fibre, and such an additional step must be regarded as falling within the scope of protection of the methods as indicated above.

In a further embodiment, the present invention provides a method of manufacturing a jacket tube for a preform of an optical fibre. A jacket tube is a cylindrical tube of (undoped) silica, which can be placed over a preform rod in such a manner that the rod and the tube are coaxial. A common end of the rod and the jacket tube is subsequently fused together, whereupon the fibre is drawn from said fused-together common end and the rest of the rod and the tube will gradually fuse together upon continuation of the drawing process. Since the jacket tube is located outside the undoped cladding portion of the preform rod, the jacket tube need not be of a high optical quality; the use of the jacket tube according to this method is thus simply an inexpensive way of adding extra silica to the exterior of the preform rod (thereby increasing the thickness of the final preform, so that a longer fibre having a specific diameter can be drawn therefrom). According to a method, jacket tubes are obtained by carrying out outside vapour deposition (OVD) for depositing a silica material to a substrate tube or mandrel by means of a deposition process; which operation is substantially followed by a drying, sintering and processing operation. The addition of extra silica to the outer side of the preform rod can also be carried out by means of a deposition process, using silica particles.

In a further embodiment, the present invention provides an alternative method of manufacturing a jacket tube for a preform of an optical fibre, wherein the method includes that use is made of the PCVD process for applying layers of undoped silica on the interior surface of a cylindrical, vitreous tube, which PCVD process is carried out in an apparatus according to the present invention, the tube being located along the cylindrical axis and within the inner wall of the resonant cavity, wherein the tube and said resonant cavity are essentially coaxial and wherein the resonant cavity is moved back and forth along (at least part of) the length of the tube. The final product (tube+deposited silica) represents the required jacket tube.

It should be noted that where mention is made of the movement of the resonant cavity along the length of the substrate tube or vitreous jacket, the movement is understood to be a relative movement, i.e. in practice either the resonant cavity or the substrate may be moved, as long as a relative movement of the two (along the common cylindrical axis thereof) takes place. The inner tube is to be regarded as being stationary relative to the resonant cavity, however.

While the present invention has been described with reference to specific embodiments and examples, it is envisioned that alternative embodiments and modifications to the embodiments provided herein may be modified by those skilled in the art without departing from the scope of the invention, and it is intended that those modifications and embodiments be covered by the following claims.

What is claimed is:

1. An apparatus for plasma chemical vapor deposition, comprising:
    a resonator having a resonant cavity formed essentially cylindrically symmetrically around a cylindrical axis along which a substrate tube is positioned, wherein the resonant cavity is substantially annular in shape with a cylindrical inner wall and a cylindrical outer wall, and wherein the cylindrical inner wall comprises a slit that extends along at least part of a circle around the cylindrical axis, into which resonant cavity a microwaveguide extends so that microwaves can exit to the cavity enclosed by the cylindrical inner wall via the slit, and wherein the resonator surrounds at least part of the substrate tube and moves back and forth along the longitudinal axis of the substrate tube during deposition;
    a hollow inner tube positioned in close fit against the cylindrical inner wall of the resonant cavity, wherein the inner tube extends along the cylindrical axis at least part of the length of the resonant cavity and is transparent to microwaves, and wherein the inner tube is connected to the resonator and moves synchronously therewith along the longitudinal axis of the substrate tube; and
    an inner ring positioned at one end of the inner tube, the inner ring reducing the internal diameter of the inner tube at the location of the inner ring, the inner ring operable for centering the substrate tube within the interior of the inner tube and spacing the substrate tube apart from the interior wall of the inner tube;
    wherein the length of the inner tube is no more than twice the length of the resonator, and wherein the inner tube includes at least one circumferential opening extending along part of a circle around the wall of the inner tube.

2. An apparatus according to claim 1, wherein the inner tube extends along the cylindrical axis to outside the resonator.

3. An apparatus according to claim 1, wherein the length of the inner tube is less than the length of the substrate tube.

4. An apparatus according to claim 1, wherein a difference between the external diameter of the substrate tube and the internal diameter of the inner ring is no more than about 3 mm.

5. An apparatus according to claim 1, wherein the inner tube includes an inner ring at both ends.

6. An apparatus according to claim 1, wherein the at least one opening is positioned proximate the slit in the cylindrical inner wall of the resonant cavity.

7. An apparatus according to claim 1, wherein the microwaveguide includes a means for supplying a gas to the space enclosed by the cylindrical inner wall of the resonant cavity and the inner tube.

8. An apparatus according to claim 1, wherein the slit in the cylindrical wall of the resonant cavity extends in a full circle around the cylindrical axis.

9. An apparatus according to claim 1, wherein the inner tube is made of quartz glass having a melting point higher than 1000° C.

10. An apparatus according to claim 1, wherein the internal diameter of the inner tube varies along the length thereof.

* * * * *